United States Patent [19]

Sotoyama et al.

[11] Patent Number: 5,594,093
[45] Date of Patent: Jan. 14, 1997

[54] NONLINEAR OPTICAL MATERIAL AND NONLINEAR OPTICAL DEVICE AND DIRECTIONAL COUPLING TYPE OPTICAL SWITCH USING SAME

[75] Inventors: Wataru Sotoyama; Satoshi Tatsuura; Tetsuzo Yoshimura; Azuma Matsuura; Tomoaki Hayano, all of Kawasaki, Japan

[73] Assignee: Fujitsu Limited, Kawasaki, Japan

[21] Appl. No.: 463,853

[22] Filed: Jun. 5, 1995

Related U.S. Application Data

[63] Continuation-in-part of Ser. No. 88,649, Jul. 9, 1993, Pat. No. 5,459,232.

[30] Foreign Application Priority Data

Jul. 13, 1992 [JP] Japan ................................ 4-184895
Jun. 25, 1993 [JP] Japan ................................ 5-155418

[51] Int. Cl.⁶ .................................................. C08G 73/10
[52] U.S. Cl. .................... 528/353; 528/170; 528/172; 528/173; 528/220; 528/229; 528/322; 528/327; 528/331; 528/332; 528/335; 528/422; 528/423; 525/282; 525/284; 525/289; 359/241; 359/245; 385/141; 385/143
[58] Field of Search ................................ 528/170, 172, 528/353, 173, 220, 229, 327, 330, 322, 335, 331, 332, 422, 423; 525/282, 284, 289; 359/241, 245; 385/141, 143

[56] References Cited

U.S. PATENT DOCUMENTS

| | | |
|---|---|---|
| 4,282,309 | 8/1981 | Laridon et al. . |
| 4,694,066 | 9/1987 | DeMartino et al. . |
| 4,994,209 | 2/1991 | Okazaki . |
| 5,156,774 | 10/1992 | Leising et al. . |
| 5,189,134 | 2/1993 | Mignani et al. . |
| 5,194,548 | 3/1993 | Yoshimura . |
| 5,212,269 | 5/1993 | Fischer et al. . |
| 5,256,784 | 10/1993 | Francis et al. . |

OTHER PUBLICATIONS

Chemical Abstracts, vol. 119, No. 14, Oct. 4, 1993; 149198d, "Preparation of 4,4'– diaminotriphenylamine derivatives as intermediates for nonlinear optical materials and functional dyes", Aramaki.

Appl. Phys. Lett. 68(3), 21 Jan. 1991; J. W. Wu et al.; "Thermal stability of electro–optic response in poled polyamide systems"; pp. 225–226.

IEEE Transactions on Components, Hybrids, and Manufacturing Technology, vol. 13, No. 2, Jun. 1990; R. Wayne Johnson et al.; "Benzocyclobutene Interlayer Dielectrics for Thin Film Multichip Modules", pp. 347–352.

*Primary Examiner*—Morton Foelak
*Assistant Examiner*—P. Hampton-Hightower
*Attorney, Agent, or Firm*—Armstrong, Westerman, Hattori, McLeland & Naughton

[57] ABSTRACT

A nonlinear optical polymer material comprising at least one polymer selected from the group consiting of polyimides, acrylic resins and benzocyclobutene resins containing, as a guest molecule, as a side chain, or in the main chain, a molecule or a chemical moiety having a basic structure of merocyanine dye represented by the formula (I):

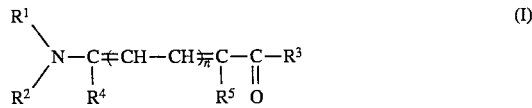

wherein $R^1$, $R^2$, $R^3$, $R^4$, and $R^5$ independently represent hydrogen or an organic group, provided that $R^1$ and $R^2$ or $R^3$ and $R^5$ may independently combine together to form an organo ring structure, and n is an integer of 1 to 3.

6 Claims, 3 Drawing Sheets

COUPLING LENGTH
$\pi / 2\kappa$

CHANGE IN INDEX OF REFRACTION
$K \rightarrow K'$

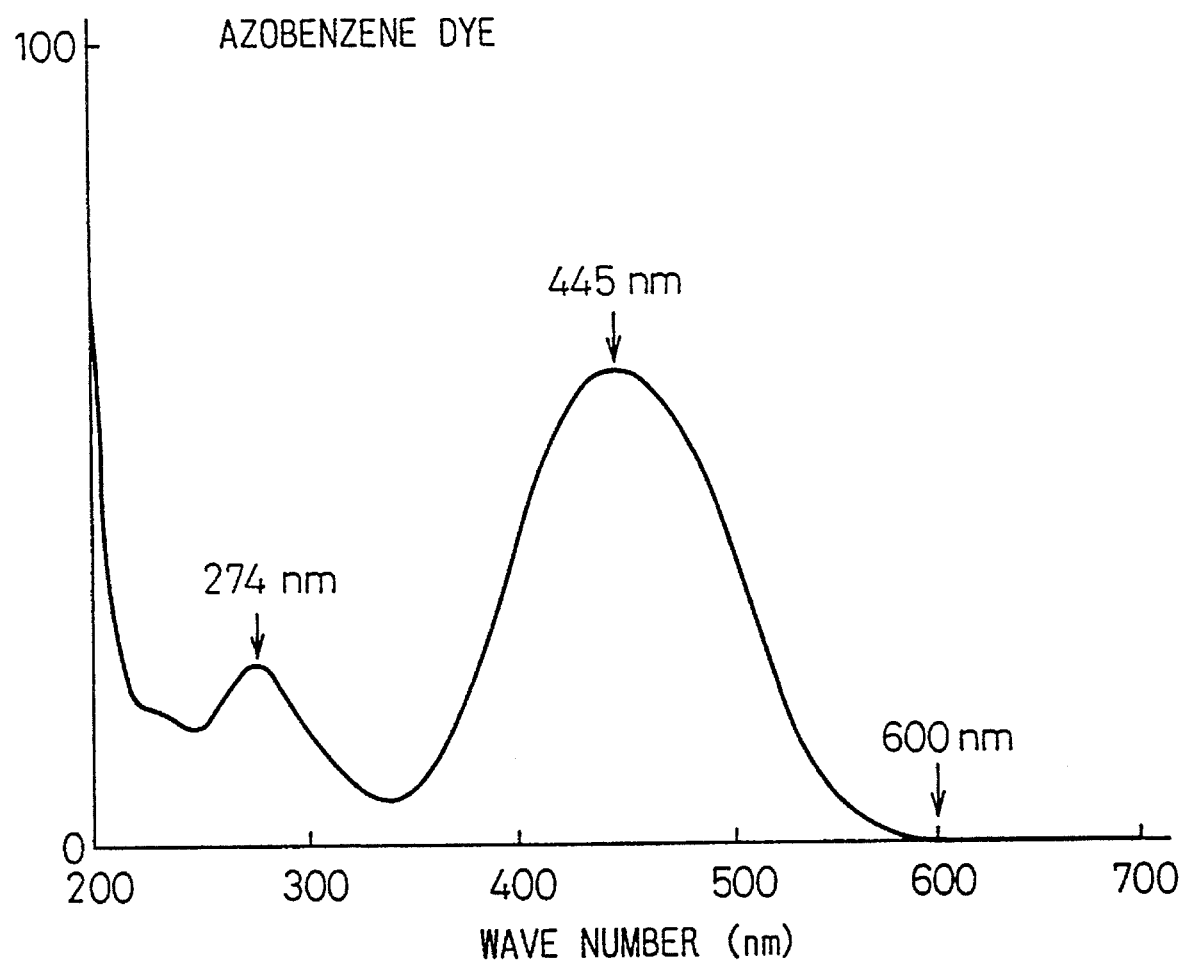

NONLINEAR OPTICAL MATERIAL AND NONLINEAR OPTICAL DEVICE AND DIRECTIONAL COUPLING TYPE OPTICAL SWITCH USING SAME

CROSS-REFERENCE TO RELATED APPLICATION

This application is a continuation-in-part of Ser. No. 08/088,649 filed Jul. 9, 1993, now U.S. Pat. No. 5,459,232.

BACKGROUND OF THE INVENTION

1. Field of the invention

The present invention relates to a nonlinear optical material and a nonlinear optical device and a directional coupling type optical switch using the same.

2. Description of the Related Art

In optical data processing equipment for optical exchanges, optical computers, optical interconnections, and the like, optical switches which exchange the light among waveguides by electrical signals are indispensable. As the basic form of an optical switch, the directional coupler shown in FIG. 1 for example is known. When two waveguides 1 and 1' are made to approach each other to about a wavelength of light 2, transfer of optical power occurs between the waveguides at a certain coupling length. A directional coupling type optical switch is one which controls the transfer of the optical power by causing the index of refraction of the coupling portion to change by, for example, the electro-optic effect.

The conventional directional coupler had been comprised between two waveguides on a plane, but we newly proposed a multilayer type directional coupler obtained by superposing layers of waveguides and constituting directional couplers between those layers (see Japanese Unexamined Patent Publication No. 6-82642 (Application No. 4-48961 and 5-38869)). Using this multilayer directional coupler, it becomes possible to achieve a high degree of integration of the optical circuits.

The distance over which the transfer of light occurs (i.e., coupling length) is determined by the thickness and index of refraction of the core and cladding layers of the waveguides. When fabricating a directional coupler, it is necessary to bring the waveguides close to each other by exactly the distance suitable for the coupling length. In a conventional planar type directional coupler, it had been easy to bring the waveguides into close proximity by exactly the necessary distance, but a suitable technique for a multilayer type directional coupler as we had newly proposed had not been conventionally known.

At the time of fabricating the directional coupler, it is necessary to bring the two waveguides 1 and 1' close together as shown in, for example, FIG. 1, by exactly the interval suitable for the coupling length. In the conventional planar type directional coupler, it had been easy to bring the waveguides close to each other by exactly the necessary interval, but in the multilayer type directional coupler we newly proposed, there had been no suitable technique for this.

In the case of constituting a directional coupler, the coupling constant ($\kappa$) between waveguides and the difference ($\beta$) between the propagation constants ($\delta$) of the two waveguides become important (for example, Yariv. Introduction to Optical Electronics, 3rd edition (Holt, Rinehart and Winston, Inc.), published in Japan as Hikari Electronics no Kiso, 3rd edition (Maruzen), Chapter 13). The length (i.e., coupling length) of a directional coupler is expressed as $\pi/2\kappa$, while the maximum value of the transfer of optical power at the time of insertion of light into a waveguide is expressed by $\kappa^2/(\kappa^2+\delta^2)$. That is, for use as a directional coupler, it is necessary that coupling constant $\kappa$ be sufficiently larger than propagation constant $\delta$.

The conventional optical coupler had been fabricated by formation of waveguides on a substrate of an electro-optic material such as $LiNbO_3$ by, for example, diffusion of Ti (for example, see Nishihara, Haruna, and Suhara, Optical Integrated Circuits (Ohm Co.), Chapter 10). At this time, while the electrode structures differ depending on the optical axes of the crystal, basically in the state with no electric field applied, the propagation constants $\delta$ are equal ($\beta=0$). In two waveguides between which transfer of light occurs, by applying a voltage (i.e., giving a difference in index of refraction to the two waveguides) so as to give a difference to the propagation constants $\delta$, the transfer or leakage of light is suppressed and switching is performed.

When it was attempted to apply this method to a multilayer type directional coupler using a conventional polymer electro-optic material, however, difficulties occurred. In a polymer electro-optic material for poling, for example, an electric field orientation treatment is performed to impart nonlinear optical characteristics, but the electrodes used for the electric field orientation treatment are used as they are as the electrodes for bringing out the electro-optic effect. In this case, the change in the index of refraction due to the electro-optic effect becomes substantially equal for all layers and it is not possible to give a difference in propagation constants $\delta$ to two waveguides by applying a voltage. Further, even in the case of using the third-order nonlinear optical effect or the thermo-optic effect, in a multilayer type directional coupler, it is difficult to change the index of refraction for just one waveguide.

A second-order nonlinear optical material, however, is only realized by a substance which does not have inverted symmetry, and therefore, the polymer has to be subjected to a poling treatment to orient the molecules in one direction. Such molecularly oriented polymers, however, have the defects of a gradual weakening of the orientation and a smaller nonlinear effect due to the heat motion of the molecular chains. To prevent this relaxation of orientation, it is effective to use a polymer with a high glass transition temperature. Use of a polyimide, which is a polymer with a high heat resistance, is being looked at. From this viewpoint, Wu et al. of Lockheed have obtained a diffusion type nonlinear optical polymer using a polyimide as a host by mixing molecules with a large nonlinear optical effect into polyamic acid and performing polyimidization while performing a poling treatment (J. W. Wu et al., Appl. Phys. Lett. 58. 225 (1991)). This material does not exhibit attenuation of the nonlinear optical response (i.e., electro-optic effect: EO effect) due to the relaxation of orientation even in the face of heat treatment of 150° C. for 10 hours or more, but the EO coefficient is a few pm/V (EO coefficient of $LiNbO_3$ is 30 pm/V), and therefore, the material is not practical. The EO coefficient is small in this material probably because the concentration of the guest nonlinear optical molecules in the diffusion type material cannot be made that large.

The present inventors previously proposed the use of an azobenzene dye in the nonlinear optical material (see Japanese Unexamined Patent Publication No. 5-196214 (Application No. 4-7607)). However, when the azobenzene dye is used as a waveguide type electrooptical device (e.g., optical switch, light modulator), the wavelength ($\lambda$) of light usable is limited to a long wavelength of 1 μm or more due to the high absorption loss because the azobenzene dye has a wide shape of the light absorption spectrum.

SUMMARY OF THE INVENTION

Accordingly, the object of the present invention is to overcome the above-mentioned problems in the prior art and to provide a nonlinear polymer material with a large nonlinear optical effect and a superior heat resistance.

Another object of the present invention is to provide an optical device using the above-mentioned nonlinear polymer material.

Other objects and advantages of the present invention will be apparent from the following description.

In accordance with the present invention, there is provided a nonlinear optical polymer material comprising at least one polymer selected from the group consisting of polyimides, acrylic resins and benzocyclobutene resins containing, as a guest molecule, as a side chain, or in the main chain, a molecule or a chemical moiety having a basic structure of merocyanine dye represented by the formula (I):

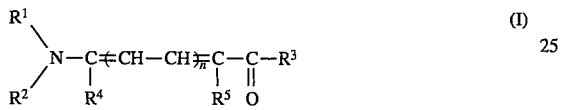

wherein $R^1$, $R^2$, $R^3$, $R^4$ and $R^5$ independently represent hydrogen or an organic group, provided that $R^1$ and $R^2$ or $R^3$ and $R^5$ may independently combine together to form an ·organo ring structure, and n is an integer of 1 to 3.

Preferably, $R^1$, $R^2$, $R^3$, $R^4$ and $R^5$ independently represents an alkyl group having 1 to 10 carbon atoms, or an alkyl chain having 1 to 10 carbon atoms bonded to a skeleton of polyimide, acrylic resin or benzocyclobutene resin, an alkyl group having 1 to 10 carbon atoms containing an ester bond, bonded to a skeleton of polyimide, acrylic resin or benzocyclobutene resin.

In accordance with the present invention, there is also provided an optical device using the above-mentioned nonlinear optical polymer material.

Typical examples of such merocyanine dye have the following structures, wherein $R_1$-$R_5$ independently represent hydrogen or an organic group, X represents O or S and n is an integer of 1 to 3.

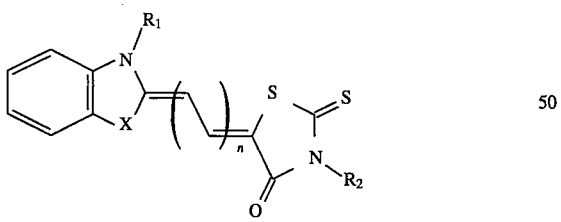

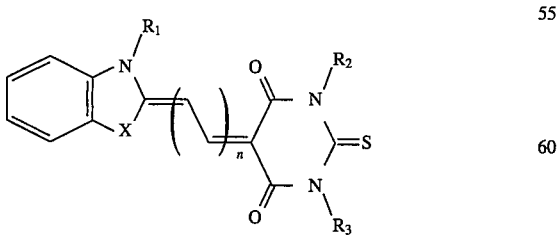

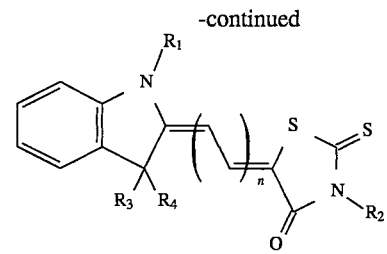

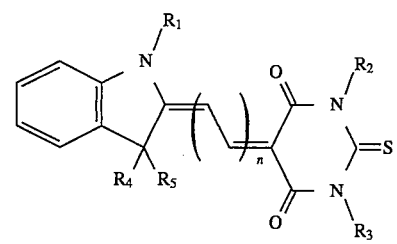

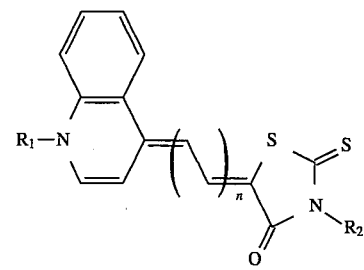

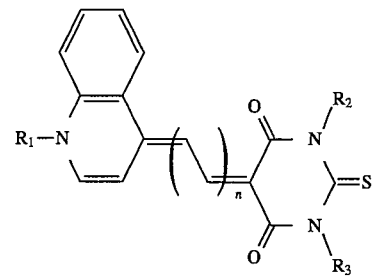

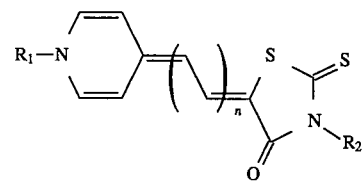

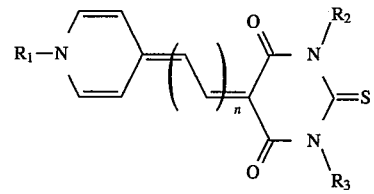

-continued

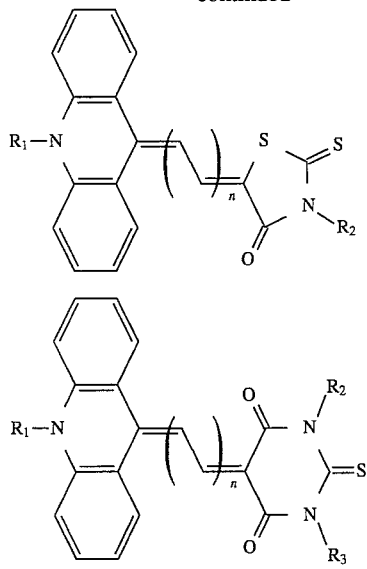

In accordance with the present invention, to remove the above-mentioned limitation ($\lambda \geq 1.0$ µm) of available wavelength, the merocyanine dye is used, instead of the azobenzene dye having absorption band thereof at the long wavelength side edge of $\lambda$=approximately 600 nm as shown in FIG. 3. Since the merocyanine dye has a sharp shape steep absorption edge of the light absorption spectrum and since the absorption band thereof at the long wavelength side edge sharply disappears i.e., $\lambda \geq 573$ nm, light having a wavelength of 0.8 µm or more can be used as a waveguide type electrooptical device, and therefore, the width of selection of the wavelength of light to be used can be widened. Furthermore, since the nonlinear optical effects can be dramatically increased due to the resonance effect by approaching the absorption wavelength of nonlinear optical molecule and the wavelength of light to be used, an electrooptical device having an extremely high efficiency can be provided when the material having a sharp absorption spectrum, such as the merocyanine dye, is used with a light source having a wavelength near the absorption wavelength of the material. Accordingly, when the merocyanine dye, which is the nonlinear optical molecule, having such a high efficiency is made as a highly heat resistant side-chain type polyimide material, the practical nonlinear optical polymer material having a high efficiency and a high heat resistance can be obtained. Furthermore, when the merocyanine dye is incorporated into an acrylic resin or benzocyclobutene resin, the practical nonlinear optical polymer material having a high efficiency can be obtained.

The above-mentioned nonlinear optical polymer material can be prepared by dissolving in a solvent at the state of, for example, polyamic acid having merocyanine dye bonded thereto, or a precursor of an acrylic resin or benzocyclobutene resin having merocyanine dye bonded thereto, followed by coating on a substrate (e.g., silicon, quartz or glass) by spin coating or dip coating, and further followed by drying and heating.

Furthermore, the above-mentioned nonlinear optical polymer material can be coated on a substrate (e.g., silicon, quartz, glass) by vapor deposition polymerization using, as a starting material, for example, diacid anhydride having merocyanine dye bonded thereto and a diamine (e.g., phenylene diamine, diamino diphenyl ether).

In accordance with the present invention, there is still further provided a directional coupling type optical switch which causes the reflection of the core portions or cladding portions of two waveguides in proximity with each other to change by the electro-optic effect, the third-order nonlinear optical effect, or the thermo-optic effect using the above-mentioned polymer nonlinear optical materials and causes the coupling constant $\kappa$ between the waveguides to change.

It should be noted that here, when the indexes of refraction of the core or intermediate cladding portions of the two waveguides are made to change by, for example, the electro-optic effect, the coupling constant $\kappa$ between waveguides changes. When the coupling length $\pi/2\kappa$ is halved by changing the $\kappa$, that is, when $\kappa$ is doubled, switching of the waveguide light becomes possible. In actuality, it is difficult to realize enough of a change of the index of refraction so that the $\kappa$ doubles by, for example, the electro-optic effect. Therefore, the device length of the directional coupler is made (2n+1) times the coupling length so that multiperiodic transfer will occur in the device (see FIG. 2). In such a construction, by making the coupling length n/(n+1) times by changing the index of refraction of the core 1 or intermediate cladding layer 3, that is, by making $\kappa(n+1)/n$ times, it is possible to perform optical switching. The magnitude of coupling constant $\kappa$ changes tremendously with widths of the cores and intermediate claddings of the two waveguides. In a multilayer type directional coupler, it is easy to control the core thickness or the cladding thickness on the submicron order by, for example, spin coating or vapor deposition, and therefore, it is possible to optimize the magnitude of coupling constant $\kappa$ and make the device length a practical length (e.g., several cm or less). A directional coupling type optical switch, based on the above principle, may be a planar type as well.

In accordance with the present invention, there is further provided a directional coupler, for a multilayer type waveguide having two or more layers of waveguides on a substrate, formed between two waveguides by making the thickness of the intermediate cladding layer small in the coupling region and large in the noncoupling region.

The coupling region of the multilayer type directional coupler may be set by changing the thickness of the intermediate cladding layer between the two waveguides. Therefore, the intermediate cladding layer is formed in two stages by vapor deposition of a dielectric or spin-coating, dip-coating, a doctor blade, or other wet process. At this time, it is also possible to successively change the thickness of the intermediate cladding layer to prevent loss of light due to bends or curves in the waveguides. Also, the order of the two stages of processes in the formation of the layer may be reversed. As the material for forming the intermediate cladding layer, use may be made of an inorganic substance such as $SiO_2$, an organic polymer obtained by, for example, vapor deposition and polymerization.

In accordance with the present invention, there is further provided a directional coupler, for a multilayer type waveguide having two or more layers of waveguides on a substrate, formed between two waveguides by making the index of refraction large in the coupling region and small in the noncoupling region.

The coupling interval of the above-mentioned multilayer type directional coupler may be set by changing the index of refraction of the intermediate cladding layer between two waveguides. Toward this end, the intermediate cladding layer is formed in two stages by vapor deposition of a dielectric using two types of masks. Further, it is possible to form the intermediate cladding layer as a uniform film including a photosensitive dyestuff, then irradiate light through a mask to change the index of refraction between the coupling region and noncoupling region. As the material and method of fabrication of the cladding layer, mention may be made of vapor deposition of an inorganic dielectric, spin-coating, dip-coating, or vapor deposition and polymerization of an organic polymer.

BRIEF DESCRIPTION OF THE DRAWINGS

The present invention will be better understood from the description set forth below with reference to the accompanying drawings, wherein:

FIG. 3 is an absorption spectrum of an azobenzene dye of Example 1; and

DESCRIPTION OF THE PREFERRED EMBODIMENTS

Figure 1:
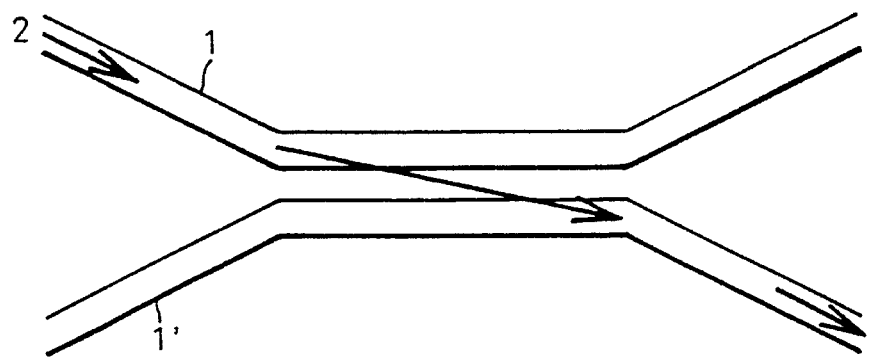
FIG. 1 is a view schematically showing the structure of a directional coupler.

The first polymeric nonlinear optical material according to the present invention is a polyimide nonlinear optical material, which incorporates the basic structure (I) of the merocyanine dye, as the guest molecule of the polyimide, or into the main chain or the side chain of the polyimide molecular chain. In this way, by combining a polyimide and the basic structure of the merocyanine dye, even when the concentration of the nonlinear optical molecules is made large, there is no precipitation of the molecules as crystals, and therefore, it is possible to make the concentration of the nonlinear optical molecules large and increase the nonlinear optical effect of the material. Further, in a side chain type polyimide, the motion of the molecules is restricted, and therefore, a heat resistance even better than a diffusion type polyimide can be expected.

The polyimide type nonlinear optical material according to the present invention can be obtained from, as a starting material, a molecule having a basic structure of the merocyanine dye having the formula (I) and two amino or acid anhydride groups. More specifically, the polyimide type nonlinear optical material can be obtained from, as a starting material, a merocyanine dye having two acid anhydride groups bonded, via an ester bond-containing alkyl chain, thereto and diamino diphenyl ether (see Example 2 below).

The second nonlinear polymer material according to the present invention can be obtained by incorporating the above-mentioned basic structure (I) of the merocyanine dye as a guest molecule of an acrylic resin or into the main or side chain of the molecule chain of acrylic resin to form the nonlinear optical material. Thus, by combining the acrylic resin with the basic structure (I) of merocyanine dye, the nonlinear optical polymer structure containing a high concentration of the merocyanine dye and having a high efficiency can be obtained. Note that the above-mentioned combination of the acrylic resin and the merocyanine dye can be obtained by mixing the merocyanine dye with the acrylic resin, or by polymerizing an acryl monomer having the merocyanine dye bonded thereto.

The third nonlinear polymer material according to the present invention can be obtained by incorporating the above-mentioned basic structure of the merocyanine dye, as a guest molecule of benzocyclobutene resin, or into the main chain or side chain of the molecule chain of the benzocyclobutene resin to form the nonlinear optical material. Thus, since the polymer obtained by polymerizing benzocyclobutene has a glass transition temperature of 200° C. or more, and therefore, is highly heat resistant, it is believed that the deterioration of the characteristics due to the relaxation of orientation can be suppressed.

The monomer serving as the raw material of the polymer is comprised of a portion having the basic structure (I) of the merocyanine dye for exhibiting the nonlinear optical effect and the benzocyclobutene portion for the polymerization reaction.

Figure 2A:
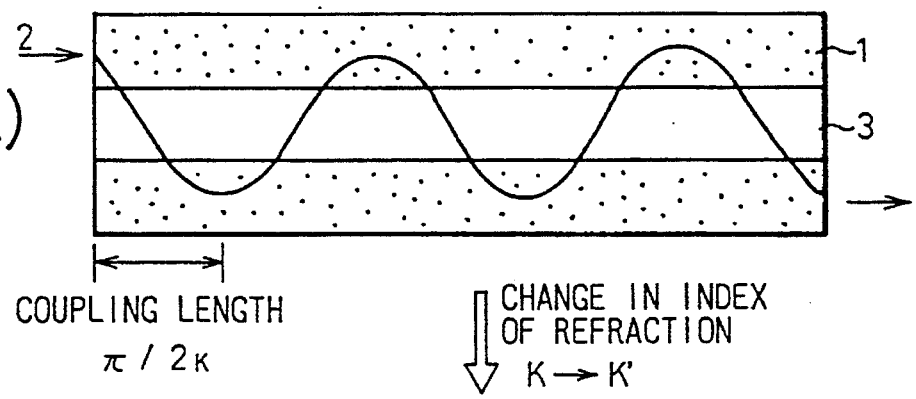
FIGS. 2(a) and (b) are views showing the state of progression of a light beam in a directional coupler of the present invention, in which the index of refraction of the core or cladding portions has been changed.
Figure 2B:
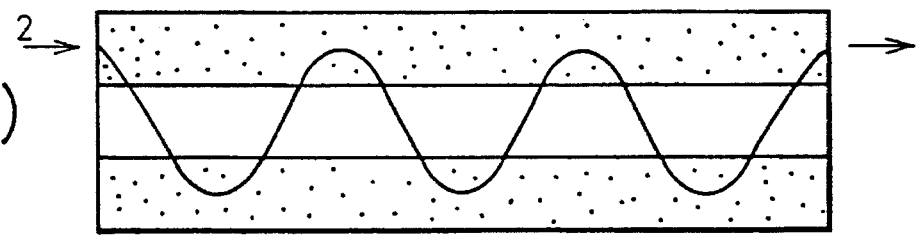

The directional coupling type optical switch according to the present invention constitutes a directional coupler wherein multiperiodic transfer of light such as shown in FIG. 2(a), (b) occurs due to the fabrication of, for example, two waveguides or waveguide layers in close proximity to each other and can perform optical switching with small changes in the coupling coefficient. Further, the portion causing the changes in the index of refraction may be constituted by a polymer given a nonlinear optical effect by an electric field orientation treatment for poling (for example, an epoxy polymer bonded with a diacetylene compound (Extended Abstracts (The 52nd Autumn Neeting, 1991); The Japan Society of Applied Physics, 11a-T-1.) It should be noted that in the actual structure, electrodes are provided for applying voltage for causing the electric field orientation treatment and the changes in the index of refraction, but these may be provided as a pair of parallel electrodes on a substrate or may be provided as counter electrodes on one substrate and the waveguide layer.

The multilayer waveguide directional coupler according to the present invention may be produced by forming the intermediate cladding layer by vapor deposition of a dielectric or a wet process, i.e.: for example forming a dielectric at the coupling regions and the non-coupling regions to exactly the necessary thickness by vapor deposition or a wet process without a mask, then placing a mask opened at the noncoupling region in close contact with the vapor deposition surface and further vapor depositing a dielectric so as to change the thickness of the intermediate cladding layer at the coupling region and noncoupling region or else by forming the intermediate cladding layer by vapor deposition of a dielectric, then placing a mask opened at the coupling region in close contact with the vapor deposition surface and vapor depositing a high refraction index dielectric to exactly the necessary thickness and placing a mask opened at the noncoupling region in close contact with the vapor deposition surface and vapor depositing a low refraction index dielectric to exactly the same thickness so as to change the index of refraction of the intermediate cladding layer at the coupling region and noncoupling region.

According to the present invention, it is possible to fabricate a directional coupler by forming the intermediate cladding layer by vapor deposition of a dielectric or a wet process, vapor depositing or spin coating a dielectric to exactly the necessary thickness in the coupling region and non-coupling region without a mask, then placing a mask opened at the noncoupling region parallel to the vapor deposition surface away from that vapor deposition surface and further vapor depositing a dielectric, thereby successively changing the thickness of the intermediate cladding layer in the coupling region and noncoupling region. It should be noted that it is possible to use a mask opened at the noncoupling region to vapor deposit the dielectric, then form the dielectric by vapor deposition or the wet process without a mask or alternatively to reverse the order of the same. In the above method, it is also possible to coat a resist on the coupling regions, then form a dielectric on the entire surface by vapor deposition or a wet process, remove the resist to open the coupling portion, then further form a dielectric on the entire surface by vapor deposition or a wet process or it is possible to form a dielectric on the entire surface, then coat a resist on the noncoupling region, and etch the coupling region so as to change the thickness at the coupling portion and the noncoupling portion or to form a dielectric on the entire surface, then cover the noncoupling region with a mask and dry etch the coupling portion so as to change the thickness at the coupling region and noncoupling region. As the vapor deposited dielectric, use may be made of a transparent inorganic substance such as, for example, silicon oxide ($SiO_2$), silicon monoxide (SiO), aluminum oxide ($Al_2O_3$), tungsten oxide ($WO_3$), calcium fluoride ($CaF_2$), or a vapor deposited polymerized film of an organic substance (such as, for example, a polyimide, polyamide, polyurea, polyazomethine, epoxy polymer, but use may be suitably used of a polymer nonlinear optical material of the present invention.

According to the present invention, a mask opened at the noncoupling region is used to vapor deposit a low refraction index dielectric, then a mask opened at the coupling region is used to vapor deposit a high refraction index dielectric. This order may also be reversed. Alternatively, a mask opened at the noncoupling region may used to vapor deposit a low refraction index dielectric, then a high refraction index dielectric may be vapor deposited or formed by spin coating or dip coating without a mask. Further, a resist may be coated on the coupling region, then a low refraction index dielectric may be vapor deposited or formed by spin coating or dip coating on the entire surface, the resist may be removed to open up the coupling region, then a high refraction index dielectric may be vapor deposited or formed by spin coating or dip coating. It should be noted that it is possible to prepare a directional coupler designed to change the index of refraction of the intermediate cladding layer in the coupling region and noncoupling region by making the intermediate cladding layer of a dielectric including photosensitive molecules, forming it to the necessary thickness on the coupling region and noncoupling region as a whole, then irradiating light through a mask opened at the noncoupling region so as to cause a reduction of the index of refraction by the photo reaction of the photosensitive molecules in the noncoupling region. In this case, it is also possible to fabricate a directional coupler designed to change the index of refraction of the intermediate cladding layer in the coupling region and the noncoupling region by making the intermediate cladding layer of a dielectric, including photosensitive molecules, forming this on the coupling region and non coupling region as a whole to the necessary thickness, then irradiating light through a mask opened at the coupling region, thereby causing the index of refraction to increase by the photo reaction of the photosensitive molecules in the coupling region. As the dielectric, it is possible to use the above-mentioned inorganic substance. For the intermediate cladding layer, use may be suitably be made of the above-mentioned polymer nonlinear optical material of the present invention.

According to the present invention, provision is made of a specific polymer nonlinear material superior in both the nonlinear optical effect and heat resistance. Further, according to the present invention, by making the thickness of the intermediate cladding layer small or by making the index of refraction of the intermediate cladding layer large, it is possible to set the desired coupling length even in a multilayer type directional coupler.

EXAMPLES

The present invention will now be further illustrated by, but is by no means limited to, the following Examples.

Example 1

The absorption spectrum of the previously proposed azobenzene dye having the following formula is shown in FIG. 3.

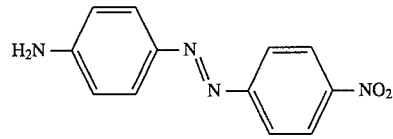

Figure 4:
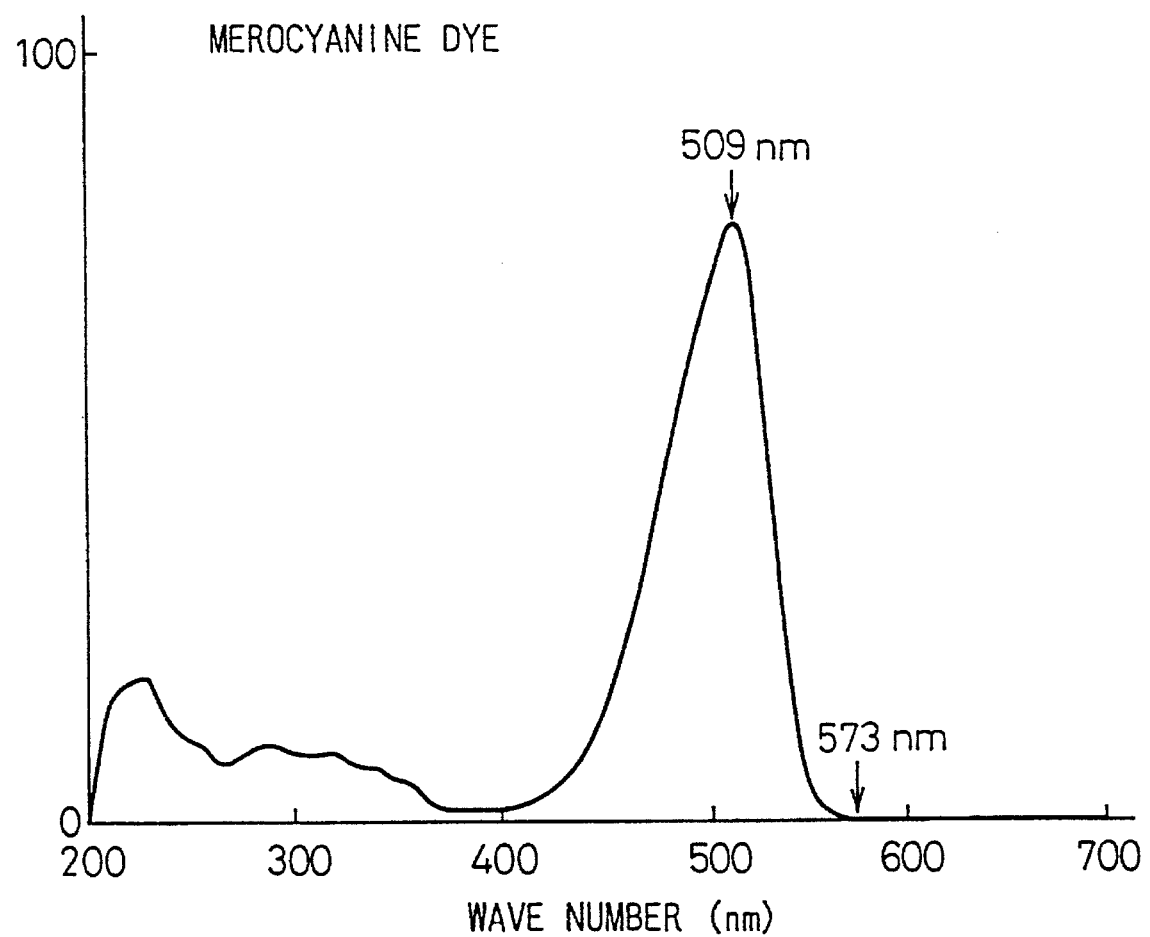
FIG. 4 is an absorption spectrum of a merocyanine dye of Example 1.

Contrary to the above, the absorption spectrum of the merocyanine dye having the following formula according to the present invention is shown in FIG. 4.

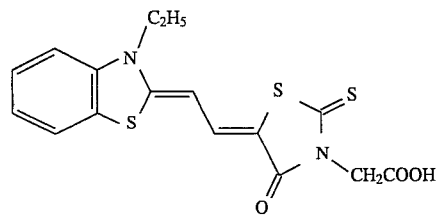

As is clear from the comparison of FIGS. 3 and 4, the absorption spectrum of the merocyanine dye (FIG. 4) has very sharp absorption band, when compared with the absorption spectrum of the azobenzene dye (FIG. 3).

Example 2

Molecule 1 having the following structure:

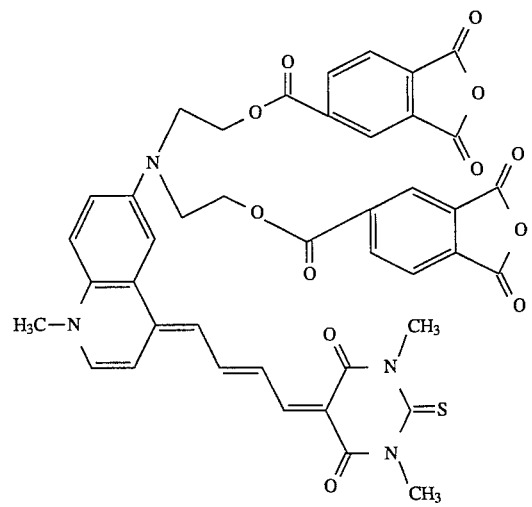

and molecule 2 having the following structure:

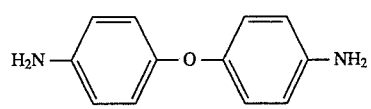

were mixed at an equivalent ratio of 1:1 in N,N-dimethyl formamide (DMF) to obtain polyamic acid having the following structure:

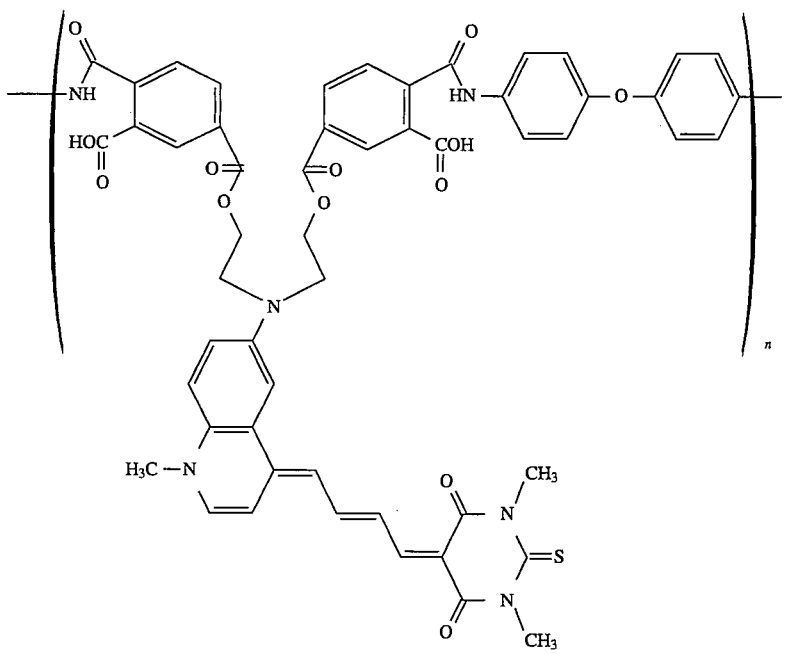

The resultant DMF solution of the polyamic acid was spin-coated on a glass substrate with transparent ITO electrodes, followed by heating at 100° C. for one hour and 250° C. for one hour to obtain polyimide film having a thickness of 1.5 μm. After gold electrodes were vapor deposited on the polyimide film, an electrical potential difference is applied between the ITO electrodes and the gold electrodes, followed by heating to cause orientation of the nonlinear molecules in the polymer to the direction of the electric field. Thereafter, while the potential difference is applied, the orientation of the nonlinear molecule is fixed by cooling and the electric field orientation treatment was effected at an applied voltage of 150V, a heating temperature of 180° C. and a heating time of one hour. The electro-optic coefficient (r) of this sample was measured by a reflection method (C. C. Teng and H. T. Man, Appl. Phys. Lett. 56, 1734 (1990)). As a result, $r_{33}$ at light wavelength of 780 nm was 80 pm/V and $r_{33}$ at 1.3 μm was 20 pm/V. The $r_{33}$ of this sample after heating at 120° C. for 100 hours was 95% of that before the heating. Thus, it was confirmed that the nonlinear optical material having a high efficiency and a high heat resistance was obtained.

As explained above, according to the present invention, provision is made of a polymeric nonlinear optical material superior in both the nonlinear optical effect and heat resistance and further having a wide usable wavelength region longer than 573 nm as shown in FIG. 4. Further, since the indexes of refraction of the core portions or cladding portions of two directly connected waveguides are changed to change the coupling constant κ between waveguides, optical switching can be effectively carried out. Further, in a multilayer type waveguide, by changing the thickness or index of refraction of the intermediate cladding layer between the noncoupling region and the coupling region, a directional coupler is constituted between two waveguides, and therefore, it is possible to obtain a directional coupler suitable for use in a multilayer type waveguide.

We claim:

1. A nonlinear optical polymer material comprising at least one polymer selected from the group consisting of polyimides and benzocyclobutene resins containing, as a guest molecule or a side chain or in the main chain, a molecule or a chemical moiety having a basic structure of merocyanine dye selected from the group consisting of:

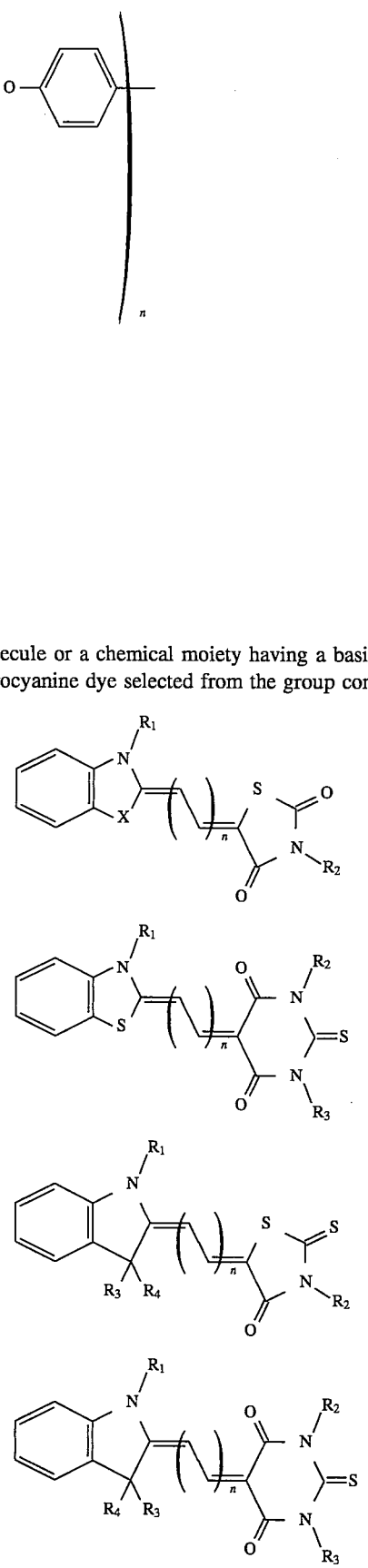

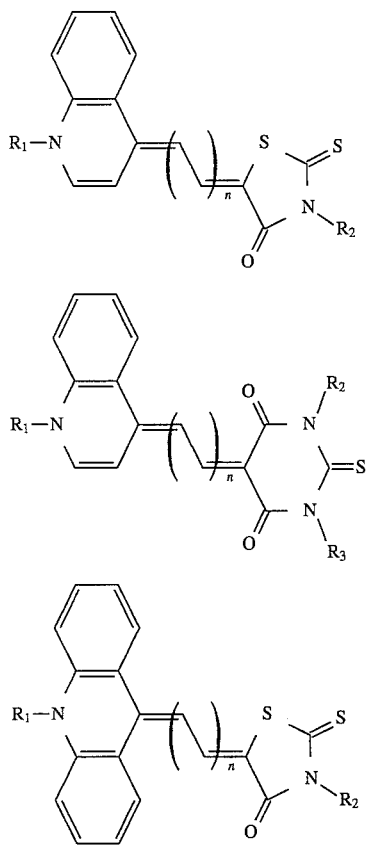

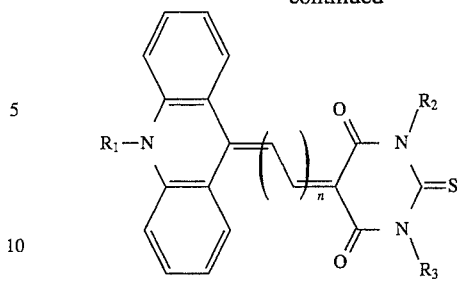

wherein $R^1$, $R^2$, $R^3$, $R^4$, and $R^5$ independently represent hydrogen or an organic group, X represents O or S, and n is an integer of 1 to 3.

2. A nonlinear optical polymer material as claimed in claim 1, wherein the polymer is a polyimide having a basic structure of the merocyanine dye.

3. A nonlinear optical device comprising a polymer material according to claim 1.

4. A waveguide device comprising a polymer material according to claim 1.

5. A directional coupling optical switch comprising a polymer material according to claim 1.

6. A nonlinear optical polymer material as claimed in claim 1, wherein the organic group is selected from the group consisting of an alkyl group having 1 to 10 carbon atoms, or an alkyl chain having 1 to 10 carbon atoms bonded to a skeleton of polyimide or benzocyclobutene resin, an alkyl group having 1 to 10 carbon atoms containing an ester bond, bonded to a skeleton of polyimide or benzocyclobutene resin.

* * * * *